Figure 1:
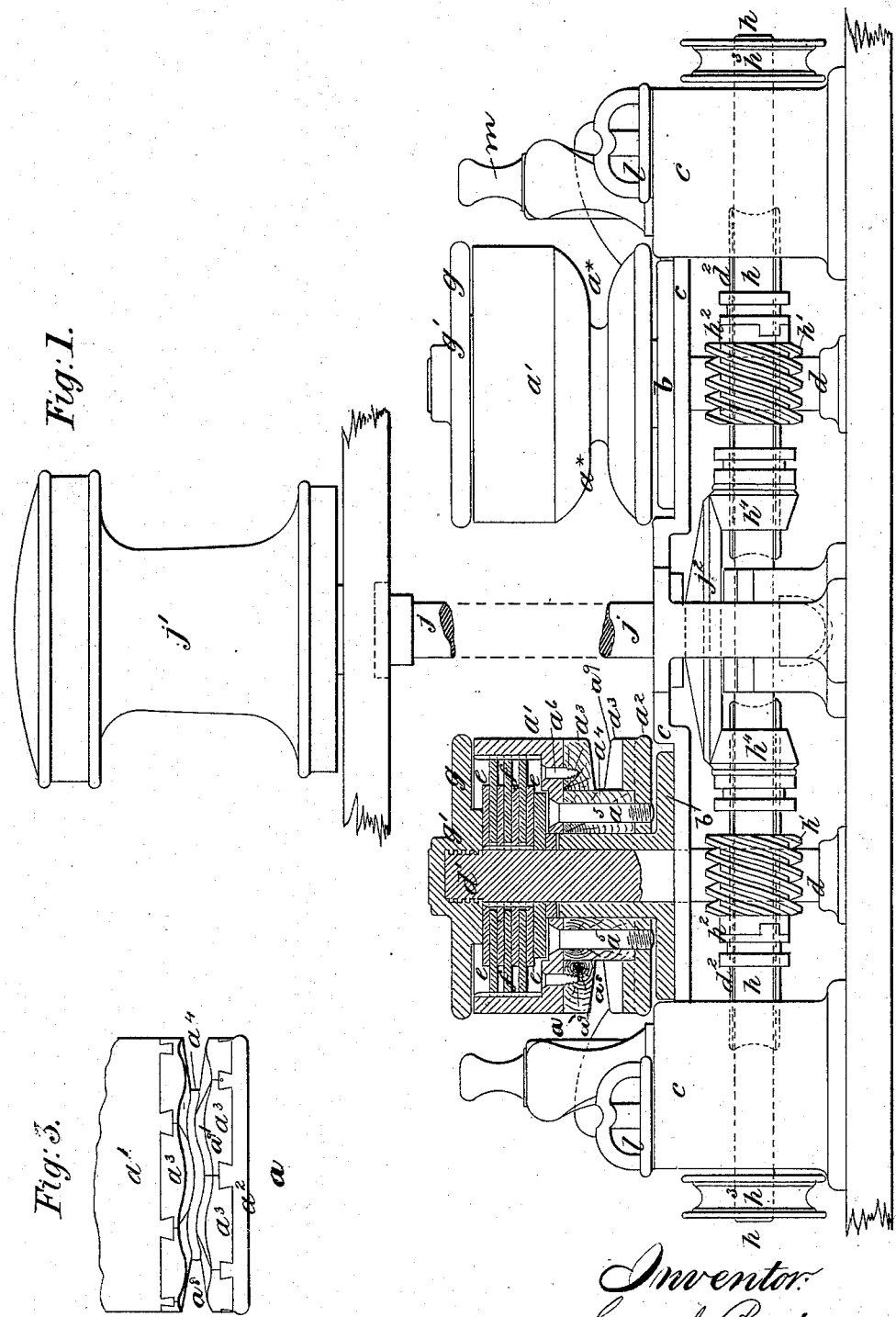

(No Model.)  3 Sheets—Sheet 1.

S. BAXTER.
WINDLASS.

No. 264,924.  Patented Sept. 26, 1882.

Inventor:
Samuel Baxter
By Knight Bros

Attest:
L. M. Hopkins
Harry E. Knight (No Model.) 3 Sheets—Sheet 2.

S. BAXTER.
WINDLASS.

No. 264,924. Patented Sept. 26, 1882.

Attest:
L. M. Hopkins
Harry E. Knight

Inventor:
Samuel Baxter,
By Knight Bros.
Attys.

(No Model.) 3 Sheets—Sheet 3.

S. BAXTER.
WINDLASS.

No. 264,924. Patented Sept. 26, 1882.

Attest:
L. M. Hopkins.
Harry E. Knight.

Inventor:
Samuel Baxter
By Knight Bros.
Attys.

UNITED STATES PATENT OFFICE.

SAMUEL BAXTER, OF LONDON, ENGLAND.

WINDLASS.

SPECIFICATION forming part of Letters Patent No. 264,924, dated September 26, 1882.

Application filed June 22, 1881. (No model.) Patented in England November 11, 1880, No. 4,649; in France May 10, 1881, No. 142,769, and in Belgium May 10, 1881, No. 34,598.

*To all whom it may concern:*

Be it known that I, SAMUEL BAXTER, a subject of the Queen of Great Britain, residing at Queen Victoria Street, in the city of London, England, have invented certain new and useful Improvements in Screw-Windlasses, or means or apparatus for working chain cables and wire or other ropes or hawsers, (for which I have received Letters Patent in England, No. 4,649, dated 11th November, 1880,) of which the following is a specification.

The invention has for its object improvements in means or apparatus for working chain cables and wire or other ropes or hawsers.

According to my invention I mount cable holders or wheels for working chain cables or wire or other ropes or hawsers upon vertical shafts, which for simplicity of gearing are made cylindrical, and are firmly fixed in position, and a solid spindle is passed through and carries upon it the required gearing for working the cable holder or wheel by either hand or steam, or by both. By this means each cable or wire or other rope or hawser would be around a cable holder or wheel, and would thus avoid the necessity for dismounting the cable rope or hawser, as it would always be on its cable holder or wheel, for "letting go anchor," "veering," "riding," and "purchasing," and would be provided with any of the well-known systems of brakes for veering and with stoppers for riding securely.

For the purpose of working wire or other ropes or hawsers I employ one or more wheels made with serpentine or curvilinear truncated V-grooves formed with continuous undulating or waved projections on each side of the grooves, such projections being formed of metal or of wood, the grooves describing parallel lines on the periphery of the wheel and converging inward to a cylindrical surface. These wheels, with suitable guide-wheels, are so arranged as to insure the wire or other rope or hawser being passed almost entirely around the main working-wheel, whereby a perfect grip is obtained of the rope.

In order that my said invention may be more clearly understood and readily carried into effect, I will proceed, aided by the accompanying drawings, more fully to describe the same.

Figure 2:
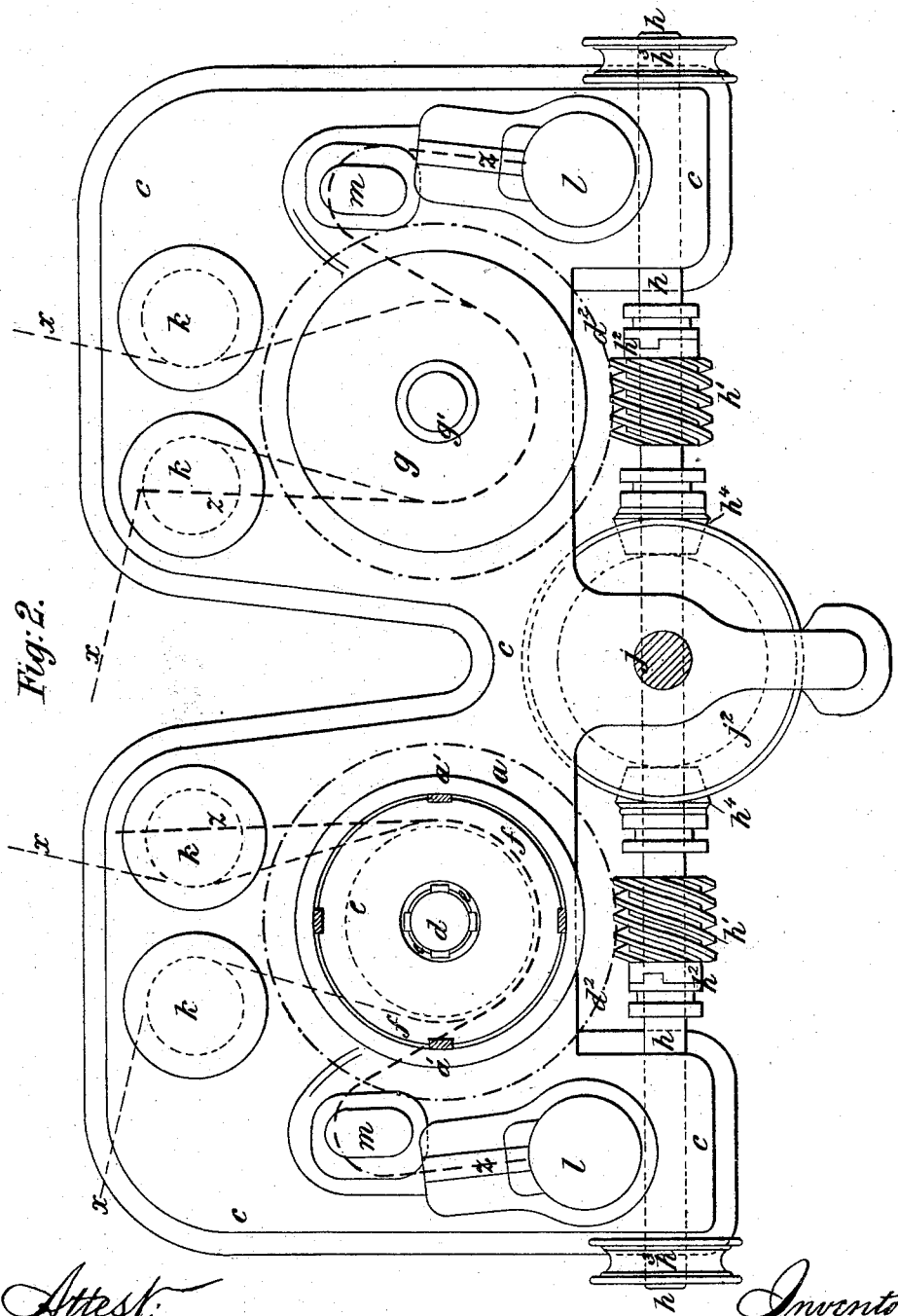
Figure 4:
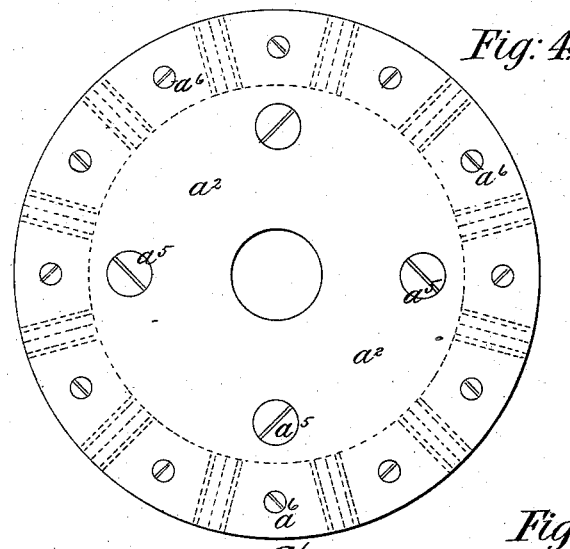
Figure 5:
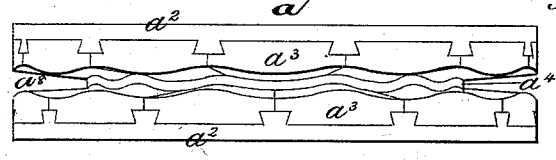
Figure 7:
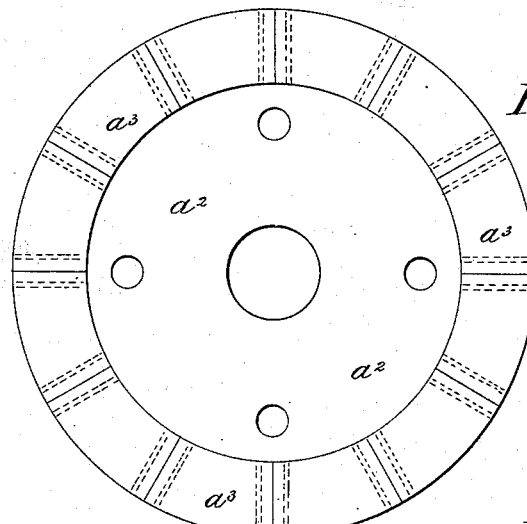
Figure 6:
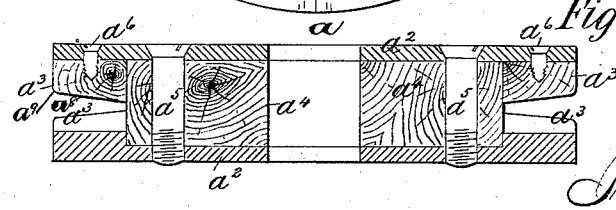

In the drawings, Figure 1 is an elevation, partly in section, and Fig. 2 is a plan, of my improved means or apparatus for working chain cables and wire or other ropes or cables; and Fig. 3 is an edge view, separately, of my improved wheel for working wire or other ropes or hawsers. Fig. 4 is a side view, Fig. 5 is an edge view, and Fig. 6 is a cross-section, of my improved wheel for working wire or other ropes or cables, and Fig. 7 is an inner face view of one half or cheek thereof; and I would here remark that in Fig. 1 I have shown applied on the left-hand vertical cylindrical axis one of my improved wheels for working wire or other ropes or hawsers and on the right-hand vertical axis an ordinary cable-holder, while in Fig. 2 I have shown the apparatus arranged for working both chain cables and wire or other ropes or hawsers.

I will first proceed to describe my invention as applied to the working of wire or other ropes or hawsers.

Waved, serpentine, or curvilinear truncated V-grooved wheels $a\ a$, constructed as hereinafter described, are mounted upon vertical hollow shafts $b\ b$, which, for strength and simplicity of gearing, are made cylindrical, and are firmly secured in position to the framing $c$, or it may be to the deck, and a solid spindle, $d$, is passed through each cylindrical hollow shaft $b$, and carries upon it the requisite gearing for working the cable-holder by either hand or steam, or by both. The following arrangement is shown in the drawings: On the upper end of each spindle $d$, within the cylindrical portion $a'$ of the cable-holder $a$, are so fitted as to be compelled to revolve with the said spindle $d$ a number of metal plates, $e$, and intermediate of such plates $e$ are other plates, $f$, which latter are so fitted as to be compelled to rotate with the cable-holder $a$. A screw, $d'$, is formed on the upper end of each spindle $d$, and a plate, $g$, formed with a nut, $g'$, is employed to put, when required, any desired amount of pressure upon the plates $e$ and $f$. By these means motion can be transmitted from the spindle $d$ to the waved V-grooved wheel $a$ when the plates $e$ and $f$ are pressed firmly together, and when such plates are relieved from pressure the wheel $a$ is free to revolve independently of its driving-spindle $d$, while by varying the pressure put upon the plates $e$ and $f$ any desired amount of resistance may be opposed to the turning of the cable-holder independently of its driving-spindle $d$, as required when veering out a cable.

I would here remark that I do not claim the plates $e\,f$, screw $d'$, plate $g$, and nut $g'$ as forming part of my present invention, as such parts are already well known and applied to windlasses and other apparatus for a similar purpose to that above described. Nor do I confine myself to the use of such parts for the purpose stated, as other means for applying a frictional connection between the wheel $a$ and the driving-spindle $d$ may be employed, so long as the wheel $a$ can, when required, be caused to rotate with or be set free of its driving-spindle, and a regulated resistance be opposed, when required, to its turning independently of its driving-spindle.

On the lower end of each spindle $d$ is fixed a worm-wheel, $d^2$, to which motion is given by a worm or screw, $h'$, mounted upon the spindle or axis $h$, and capable of being connected or disconnected therewith by a clutch, $h^2$. Motion may be given to this spindle or axis $h$ by any suitable motive power through the messenger-wheels $h^3$, and thereby give motion to the spindle or axis $h$; or motion may be communicated to such spindle or axis $h$ by means of a capstan-head, $j'$, fixed to the upper end of an axis, $j$, on the lower end of which is fixed a bevel or crown wheel, $j^2$, which takes into and gives motion to beveled pinions $h^4$, mounted on the spindle or axis $h$, and capable of being moved into and out of gear, as may be required, by which means either or both of the wheels $a$ can be rotated by the capstan-head $j'$, or both of them can be disconnected therefrom and be rotated by other means.

Although I have represented the driving-gear arranged in the same framing as that which carries the wheels $a$, I would have it understood that the wheels $a$ and parts supporting the same may be mounted on one deck, and the spindles $d$ for operating the same may be carried therefrom below deck, where they may be rotated by any suitable means, while, as shown in the drawings, when using a capstan-head for giving motion to the wheels $a$ such capstan-head may be mounted, as represented in the drawings, on a deck above the cable-deck, with its gearing above or under the cable-deck.

The mode in which I prefer to construct my improved wheel for working wire or other ropes or hawsers is represented at Figs. 3, 4, 5, 6, and 7. It consists of two cheeks, $a^2\,a^2$, formed with dovetailed or undercut recesses, to receive blocks $a^3$, of hard wood or metal, the surfaces of which are so shaped as to produce a serpentine or curvilinear truncated V-shaped groove, $a^8$, with continuous waved projections $a^9$ on each side of the said groove, which thus describes parallel lines on the periphery of the holder and converges inward to a cylindrical surface. These two cheeks $a^2\,a^2$ are kept at the required distance apart by a boss, $a^4$, and the parts $a^2\,a^3\,a^4$ are connected together by screws $a^5$, while the blocks $a^3$ are retained in position by screws $a^6$, as shown, and such wheel may also be formed with a cylindrical portion, $a'$, as shown at Fig. 3, or without it, as may be required.

I would here remark that, although I prefer to construct my improved wheel as above described, I do not confine myself thereto, as other modes of construction may be adopted so long as it is provided with a continuous waved truncated V-shaped groove so proportioned as to adapt it to receive and hold a wire rope or hawser. These improved wheels are so arranged and combined with guide-wheels $k\,k$ as to insure the wire or other rope or hawser $x$ being passed almost entirely around the main wheel $a$, whereby a perfect grip is obtained of the rope or hawser.

The waved V-groove wheels $a$, when employed apart from the apparatus before described, are fitted with the brake before described, or with any of the well-known arrangements of brakes and pawls, to enable the rotary motion thereof to be readily governed and stopped, as may be required, and they may be fitted upon axles carried by suitable base plate or plates, to enable the same to be bolted firmly to a platform or deck, as in the arrangement above described; or they may be made portable and used in a similar manner to the well-known "Blake stopper," as now used with chain cables. These waved V-groove wheels may be worked in any of the ways before described, or they may be attached to any ordinary capstan or windlass, and they may be mounted on vertical, horizontal, inclined axles. I also, in some cases, employ, in connection with such waved V-groove wheels, a clearing-guide, to insure the proper delivery of the wire rope or hawser.

In the arrangement shown in the drawings, when it is desired to work chain cables, cable-holders $a^*$, of the ordinary character, but provided with a cylindrical extension similar to that marked $a'$ in Figs. 1 and 2, are mounted on the fixed cylindrical axes $b$, in lieu of the waved V-grooved wheels $a$, and the chain cables $z$, on their way to and from the deck-stoppers $l$, are passed around the bollards $m$. By the above arrangement each cable would be around a cable-hodler, thereby avoiding the necessity for dismounting the cable, as it would always be on its cable-holder, for letting go anchor, veering, riding, and purchasing.

I am aware that I am not the first to employ a wheel having a curvilinear groove of such construction as to adapt it, by its abrupt projections, to hold the links of a chain cable. Such construction, broadly considered, I therefore disclaim, as not adapted to work wire ropes, and impracticable for my purpose.

Having thus described the nature of my said invention and the mode in which I carry the same into effect, I would have it understood that what I claim is—

1. A wire-rope holder having a waved continuous unbroken parallel-sided truncated V-groove, forming parallel lines on the periphery of the wheel and converging inward to a cylindrical surface, as set forth.

2. A wheel, $a$, having a continuous waved truncated V-groove having parallel sides, constructed substantially as herein described, and for the purpose stated.

3. A wire-rope holder, $a$, consisting of two cheeks, $a^2 a^2$, having undercut recesses, blocks $a^3$, fitting in said recesses, and formed with waved projections $a^9$, and the boss $a^4$, separating the blocks, the whole forming a holder having a continuous waved truncated V-groove, $a^8$, as set forth.

4. A wire-rope holder, $a$, having a continuous waved parallel-sided truncated V-groove, $a^8$, in combination with a fixed vertical hollow shaft, $b$, and solid driving-spindle $d$, passed through said shaft, as set forth.

5. The combination of a wire-rope holder, $a$, having a continuous waved parallel-sided truncated V-groove, $a^8$, and the guide-wheels $k\ k$, contiguous to each other and to the holder, for the purpose set forth.

6. A waved truncated V-groove wheel, $a$, fixed vertical cylindrical shaft $b$, and solid driving-shaft $d$, in combination with friction-plates $e$ and $f$, screw $d'$, and nut $g'$, as set forth.

SAML. BAXTER.

Witnesses:
  B. J. B. MILLS,
  B. M. WHITE,
  *Both of 23 Southampton Buildings, London.*